Jan. 25, 1938.    J. H. KRIECK    2,106,218
FILTERING APPARATUS
Filed April 10, 1936
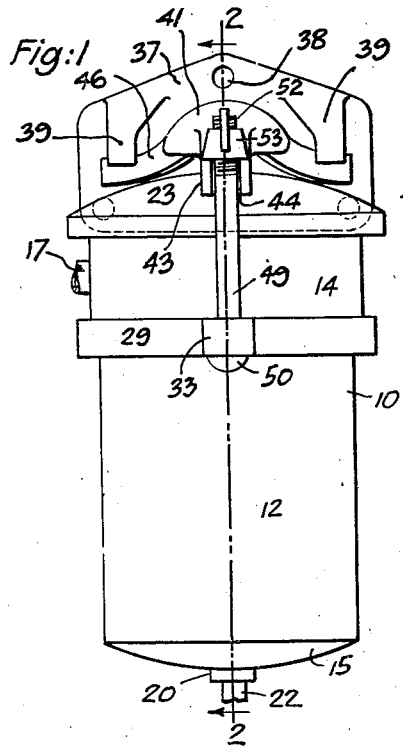
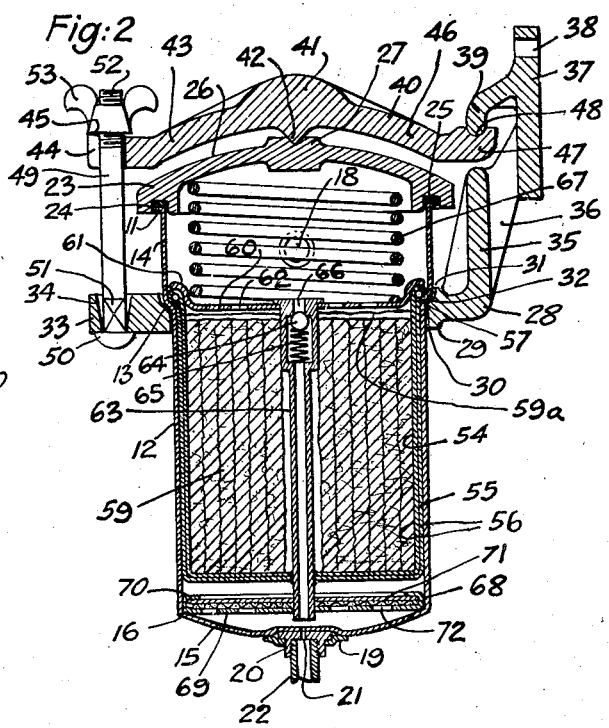
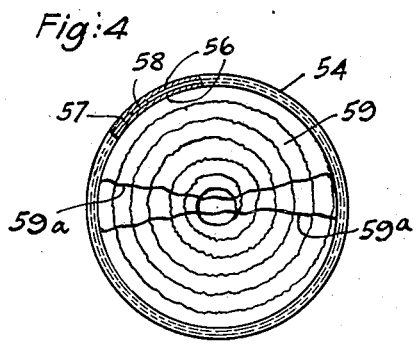
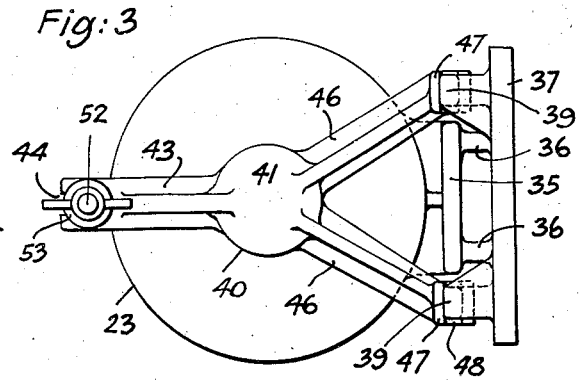
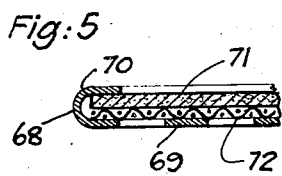
JAMES H. KRIECK
INVENTOR.
BY Walter E. Wallheim
ATTORNEY.

Patented Jan. 25, 1938

2,106,218

UNITED STATES PATENT OFFICE 2,106,218

FILTERING APPARATUS

James H. Krieck, Newark, N. J.

Application April 10, 1936, Serial No. 73,658

6 Claims. (Cl. 210—131)

This invention relates to improvements in filtering apparatuses, and is especially intended for filtering oil in connection with lubricating systems of internal combustion engines or the like, or with fuel oil lines of Diesel engines, or with supply lines to oil burning systems, or in connection with the filtering of any liquid where the removal of impurities therein is paramount.

It is one of the objects of the invention to provide in an apparatus of this kind, a series of filtering elements which cause an especially high percentage of impurities to be extracted from the oil or liquid passing through the apparatus.

Another object is to provide a fluid-tight seal between those portions of the apparatus containing, respectively, unfiltered and filtered oil whereby all unfiltered oil is forced to pass through the filtering elements.

Another object is to provide in a device of this kind a unique form of principal filter element which is provided with novel means whereby the velocity of the oil is greatly reduced before entering the filter element and with further means to permit its easy removal for purposes of replacement, repair or examination and without the aid of special tools.

A further object is to provide means in the apparatus which permit by-passing of oil in case the filtering elements should have become clogged up and thus prevent an interruption of the oil supply.

A still further object is to provide the apparatus with novel means for suspending or attaching it to a suitable place, these means at the same time serving to close the apparatus effectively making its entire removal a particularly simple step.

Other objects and advantages will become apparent after a perusal of the following specification and an inspection of the accompanying drawing in which a preferred embodiment of the invention is shown.

In the drawing,

Fig. 1 is an elevational front view of a filtering apparatus;

Fig. 2 is a longitudinal sectional view along the plane of line 2—2 in Fig. 1;

Fig. 3 is a plan view of the device;

Fig. 4 is a plan view of the principal filter element partly in section; and

Fig. 5 is a fragmentary sectional view drawn to an enlarged scale of an additional filter element.

Like characters of reference denote similar parts throughout the several views, and the following specification.

10 is a substantially open cup-shaped casing of cylindrical configuration, having an outwardly flanged top 11, a slightly reduced lower portion 12 forming a shoulder 13 where it is joined to a slightly larger top portion 14 and a bowl-shaped bottom 15 forming a shoulder 16 with the reduced portion 12.

17 is an inlet nipple fastened to the side of the top portion 14 and is provided with a relatively large inlet 18. The bottom of the casing 10 has suitably secured to it by a flange 19, an outlet nipple 20 having a relatively small outlet passage 21 and an outlet pipe 22 preferably threaded into it.

23 is a closure to the open top of the casing 10 being of substantially circular shape and having an annular groove 24 at its bottom to fit over the outwardly flanged top 11 of the casing, a resilient gasket 25 in the groove effecting a fluid-tight seal therewith. The top of the closure is rounded at 26 and is provided with a central boss 27.

28 is a support bracket for the casing 10 consisting of a substantially annular ring 29 having a round bore 30 in its center with an enlarged portion 31 forming a shoulder 32 adapted to contact with shoulder 13 of the casing 10 and to support it. 33 is a frontwardly extending projection of the ring 29 provided with a tapered rectangularly shaped opening 34. Ring 29 is extended rearwardly and provided with an upwardly extending angle plate 35 connected by ribs 36 to a support plate 37 which is provided with holes 38 for suitably bolting the bracket to a structure, and with two frontwardly and downwardly extending spaced apart lugs 39.

40 is a yoke of substantially Y-shape, having a thickened central portion 41 provided with a point 42 at its bottom to engage the central boss 27 of the top of the closure 23. A single central leg 43 of the Y-shaped yoke 40 extends frontwardly and is slotted at 44, its top where slotted being slightly inclined inwardly at 45, as clearly shown in Fig. 2. Its two rearwardly extending legs 46 are thickened at their ends at 47 and provided with grooves 48 to engage the two lugs 39 of the support plate 37.

49 is a bolt having a head 50 engaging the underside of the projection 33 of the support bracket 28, a square-shaped portion 51 adjacent the head engaging the aperture 34 therein, and a threaded end 52 disposed between the slot 44 of the yoke 40, and a wing nut 53 bearing upon the inclined top 45 of the end of the leg 43 of the yoke 40.

54 is a principal filter element consisting of a filter bag 55 of preferably double layers 56 of a suitable cotton fabric or the like. The open top of the bag is looped to receive and hold a ring 57 of preferably spring metal, separated at one point, as at 58, to provide adjustment. The fragmentary sectional part of Fig. 4, clearly shows this construction.

Fitted tightly within the bag is a filter unit 59 consisting of helically wound multi-ply layers of thin filter paper or the like. This paper is of the usual kind having a crinkled surface and longitudinal short grooves. The top of the filter unit 59 terminates somewhat below the top of the filter bag 55.

59a is a loop of cord across the top of the filter bag 55 and above the filter unit 59 for convenient handling of the bag and for other purposes specified hereafter. The filter bag 55 with the filter unit 59 is inserted into the casing 10 so that the loop with the metal ring 57 rests against the shoulder 13.

A circular distributor disc 60 has an upturned and outwardly extending flange 61 adapted to rest upon the top of the bag 55, its lower depending and angularly disposed portion fitting between the loop tending to spread the ring. 62 are openings through the disc. To the center of the disc is attached a downwardly extending bypass tube 63 having a ball check 64 held by a spring 65 against an inlet opening 66. The lower end of the tube extends through the filter unit 59 and the bottom of the bag 55 and terminates somewhat above the final outlet 21 from the casing 10. 67 is a coil spring above the distributor disc 60, its upper end contacting with the bottom of the closure 23, thus forcing the distributor disc tightly against the top of the bag 55 and, the top of the bag tightly against the shoulder 13, while by spreading the ring 57 the disc forces the sides of the top of the bag against the inside wall of the casing.

Resting against the shoulder 16 at the bottom of the casing 10 and having a press fit with its inner wall is an additional filter element 68 consisting of a circular perforated metal disc 69 having an upturned and drawn in flange 70 clamping over the disc a sheet 71 of preferably pure virgin wool reinforced by a sheet of wire netting 72. This disc is adapted to slide over the lower end of the by-pass tube 63.

The operation of the device is as follows: Oil is admitted under pressure into the upper portion of the filter through inlet 18. It is then spread uniformly over the filter elements by the openings 62 in the distributor disc 60 whereby its velocity is reduced and is forced lengthwise through the filter unit 59. It is then again filtered by passing through the double layers 56 of the cotton fabric of the filter bag 55. Then at the lower portion of the casing it is again filtered through the sheet 71 of pure virgin wool fabric, and passes out of the filter through the final small outlet 21.

There are thus three distinct stages of filtering provided for in the apparatus, first the filter paper, then the double layers of cotton fabric, and lastly the sheet of pure virgin wool.

Closing of the device is very simply effected by merely placing the yoke 40 over the closure plate 23 so that the grooves 48 at the ends of the two rearwardly extending legs 46 engage the lugs 39. The center point 42 of the yoke contacts with the central boss 27 and is forced against it by tightening the wing nut 53 on bolt 49 against the inclined top 45 of the front end of leg 43, the inclined surface preventing the wing nut from slipping off the leg while tightening. The bolt 49, being fitted in the tapered hole 34 of the support bracket 28 can be tilted outwardly to clear the yoke 40 when desired to open the device.

Attention is now particularly drawn to the fact that the yoke by its unique construction contacts with three spaced points, namely the ends of the two rearwardly extending legs with the support bracket and the end of the front leg with the wing nut of the bolt 49 and that by tightening this wing nut, a uniform pressure is concentrated by a single tightening operation upon the center of the closure plate 23. This causes a tight joint to be made between the closure plate and the top flange of the casing 10 and the casing to be securely held with its shoulder 13 against the support bracket 28. The coil spring 67 exerts a pressure against the distributor disc 60 and forces it tightly against the top end of the bag 55 which rests also against the shoulder 13 inside of the casing 10, the lower tapered portion of the disc 60 entering, as explained before, the loop at the top of the bag like a wedge and thereby expands the spring ring 57 making also a tight joint between the looped top of the bag 55 and the inside wall of the casing 10 above its shoulder 13. It will thus be seen that the pressure against the top of the closure plate 26 is transferred to the inside of the device to effect a tight sealing between that part of the device which contains the unfiltered oil whereby all oil is forced to pass through the filtering elements.

It is the function of the distributor disc 60 to cause the oil to be admitted over the filter unit 59 in separated streams whereby its force and velocity are diminished to a great degree resulting in more efficient filtering. The outlet 21 is made of a size much smaller than the inlet 18 to cause a slight back pressure to build up at the outlet end of the filter unit resulting in a partial balancing of the filter bag and unit and a still further slowing up of the velocity of the liquid. This also helps to maintain a uniform pressure at the outlet end preventing a too rapid discharge therefrom with a corresponding drop in oil pressure.

The check 64 in the by-pass tube 63 is held against the inlet opening 66 to the tube by a spring stronger than the normal oil inlet pressure. Should, however, the filter unit become clogged up by impurities, this normal pressure will be increased and become high enough to overcome the pressure of the spring, thus permitting oil to by-pass the filter elements through the tube 63 to the outlet without interrupting the flow of oil.

Attention is also drawn to the facility with which the filter bag 55 with the filter unit 59 can be removed from the casing. Taking hold of the looped cord 59a at the top of the bag and pulling it will contract the metal ring 57 and thus break the contact between the top of the bag with the inside of the casing and thereby reduce the friction which otherwise would be an obstacle to an easy removal of the bag.

While I have shown a coiled spring to press the distributor disc against the bag, it is obvious, of course, that any other form of spring, a flat spring for instance, may be used. So also, the use of the by-pass arrangement is optional and may be omitted, if so desired. Wherever I have made reference to "oil", it is to be understood that this term is to be interpreted so as to cover any liquid.

It is obvious that various other changes of form, proportion and minor details may be resorted to and the construction modified to suit many other purposes without departing from the principle or sacrificing any of the advantages of the invention as defined in the appended claims.

What I claim as new, is:

1. In a filter casing having an inlet and an outlet and a shoulder therebetween, a cover for the casing, a filter bag having its open top folded over to form a loop, an adjustable ring within the loop, a distributor disc over the top of the bag having a depressed tapered portion entering the said bag, and means to force the said disc against the top of the bag and the said top against the shoulder, the said tapered portion of the disc simultaneously spreading the said ring while entering the top of the bag to force the sides of the loop at the top of the bag against a wall of the casing above the said shoulder.

2. In a filter casing having an inlet and an outlet and a shoulder therebetween, a cover for the casing, a filter bag having its open top folded over to form a loop, an adjustable ring within the loop, cord strung across the top of the bag to form a handle, a distributor disc over the top of the bag having a depressed tapered portion entering the said bag, and means to force the said disc against the top of the bag and the said top against the shoulder, the said tapered portion of the disc simultaneously spreading the said ring while entering the top of the bag to force the sides of the loop at the top of the bag against a wall of the casing above the said shoulder.

3. In a filter casing having an inlet and an outlet and a shoulder therebetween near its inlet, a cover for the casing, a filter bag having its open top folded over to rest against the said shoulder, a filter unit within the bag, a distributor disc over the top of the bag, means to force the said disc against the top of the bag and the said top against the said shoulder, the casing having another shoulder near its outlet, and an additional filter element near the said outlet consisting of a perforated disc tightly pressed within the casing and upon the said shoulder near its outlet and a filter sheet clamped upon it.

4. In a filter casing having an inlet and an outlet and a shoulder therebetween near its inlet, a cover for the casing, a filter bag having its open top folded over to rest against the said shoulder, a filter unit within the bag, a distributor disc over the top of the bag, means to force the said disc against the top of the bag and the said top against the said shoulder, the casing having another shoulder near its outlet, and an additional filter element near the said outlet consisting of a perforated disc tightly pressed within the casing and upon the said shoulder near its outlet and a sheet of virgin wool clamped upon it.

5. In a filter casing having an inlet and an outlet and a shoulder therebetween near its inlet, a cover for the casing, a filter bag having its open top folded over to rest against the said shoulder, a filter unit within the bag, a distributor disc over the top of the bag, means to force the said disc against the top of the bag and the said top against the said shoulder, the casing having another shoulder near its outlet, and an additional filter element near the said outlet consisting of a perforated disc tightly pressed within the casing and upon the said shoulder near its outlet and a sheet of virgin wool reinforced by wire netting clamped upon it.

6. In a filter casing having an inlet and an outlet and a shoulder therebetween near its inlet, a cover for the casing, a filter bag having its open top folded over to rest against the said shoulder, a filter unit within the bag, a distributor disc over the top of the bag, means to force the said disc against the top of the bag and the said top against the said shoulder, the casing having another shoulder near its outlet, an additional filter disc tightly pressed within the casing and upon the said shoulder near its outlet, and a by-pass tube extending from the said distributor disc through the said filter bag, filter unit and filter disc to near the said outlet and having a spring pressed check valve adapted to open and by-pass liquid directly to the outlet by an excessive inlet pressure.

JAMES H. KRIECK.